UNITED STATES PATENT OFFICE.

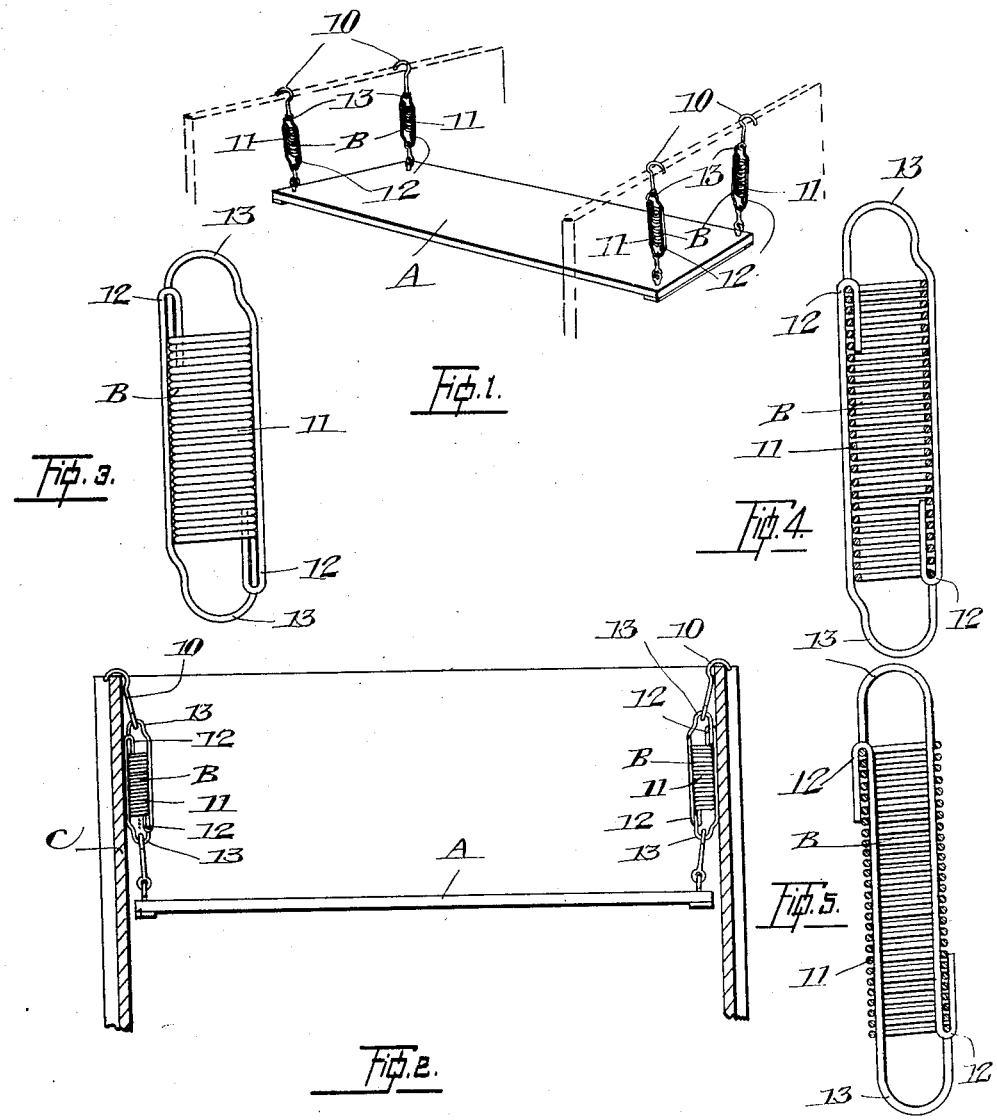

ALONZO FOWLER KEMPTON AND CHARLES EDWARD STADY, OF WAWANESA, MANITOBA, CANADA.

SPRING FOR WAGON-SEATS.

1,331,201. Specification of Letters Patent. Patented Feb. 17, 1920.

Application filed May 23, 1919. Serial No. 299,282.

*To all whom it may concern:*

Be it known that we, ALONZO FOWLER KEMPTON and CHARLES EDWARD STADY, subjects of the King of Great Britain, and residents of the town of Wawanesa, in the Province of Manitoba, Dominion of Canada, have invented certain new and useful Improvements in Springs for Wagon-Seats, of which the following is a specification.

This invention relates to improvements in springs for wagon seats, and the objects of the invention are to prevent undue expansion of the springs whereby breakage and undue stretching of the spring will be avoided, and it consists essentially of a coiled spring having the end bent backwardly over the coils and formed with hooks adapted to prevent the undue expansion of the spring, all as more fully set forth and described in the accompanying specification and drawings.

In the drawings:

Figure 1 is a perspective view showing the springs on a wagon seat.

Fig. 2 is a cross sectional view showing the springs on a wagon seat.

Fig. 3 is a side view of one of the springs.

Fig. 4 is a cross sectional view of one of the springs.

Fig. 5 is a section of an alternative form of the invention.

In the drawings like characters of reference indicate corresponding parts in all the figures.

Referring to the drawings, A indicates a wagon seat, and B indicates four springs at the corner of the wagon seat and provided with hooks 10 adapted to extend over the side of a wagon body C. Each of the springs B, in accordance with the present invention, is formed with a coiled portion 11, the ends of which are bent backwardly parallel with the axis of the spring and provided on the end with hook shaped stop members 13 which embrace the opposite end of the coil to that from which the end is bent. When the tension spring is closed as in Fig. 3 there is a short space between the end of the coil and the end of the hook which permits a certain degree of expansion of the spring till the limit of the expansion of the spring is reached, when the coil will be as shown in Fig. 4, the hooks limiting the expansion of the spring.

It will be seen that the bent over ends in addition to forming the hooks 12 form eyes or loops 13 by which the coil is attached.

In Figs. 1, 2 and 3 the ends of the coil which are bent backwardly extend on the outside of the coil while in Fig. 5 they extend on the inside thereof.

As many changes could be made in the above construction and many apparently widely different embodiments of our invention within the scope of the claims, constructed without departing from the spirit or scope thereof, it is intended that all matter contained in the accompanying specification and drawings shall be interpreted as illustrative and not in a limiting sense.

What we claim as our invention is:

1. A coil spring having the end of the coil bent backwardly over the coil to form a stop member adapted to limit the extension of the spring.

2. A coil spring comprising a coil having the end bent backwardly substantially parallel with the axis and formed with hooks adapted to embrace the opposite end of the coil and limit the extension thereof.

3. A coil spring comprising a coil having the end bent backwardly substantially parallel with the axis and formed at one end with loops and at the opposite end with hooks adapted to embrace the opposite end of the coil and limit the extension thereof.

In witness whereof we have hereunto set out hands in the presence of two witnesses.

ALONZO FOWLER KEMPTON.
CHARLES EDWARD STADY.

Witnesses:
C. L. ATKINSON,
C. D. KEN.